US008681274B2

(12) United States Patent
Knoedgen et al.

(10) Patent No.: US 8,681,274 B2
(45) Date of Patent: *Mar. 25, 2014

(54) MULTIPLE FRAME GRABBER (75) Inventors: Horst Knoedgen, Munich (DE); Dirk Huettmann, Baltmannsweiler (DE)

(73) Assignee: Youliza, Gehts B.V. Limited Liability Company, Dover, DE (US)

( * ) Notice: Subject to any disclaimer, the term of this patent is extended or adjusted under 35 U.S.C. 154(b) by 155 days.

This patent is subject to a terminal disclaimer.

(21) Appl. No.: 13/280,234

(22) Filed: Oct. 24, 2011

(65) Prior Publication Data

US 2012/0038779 A1 Feb. 16, 2012

Related U.S. Application Data (60) Continuation of application No. 12/456,925, filed on Jun. 24, 2009, now Pat. No. 8,068,182, which is a division of application No. 10/980,481, filed on Nov. 3, 2004, now Pat. No. 7,567,273.

(30) Foreign Application Priority Data

Oct. 12, 2004 (EP) ..................................... 04392036

(51) Int. Cl.
*H04N 17/00* (2006.01)
*H04N 5/225* (2006.01)
*H04N 9/64* (2006.01)

(52) U.S. Cl.
USPC .......................... 348/714; 348/187; 348/218.1

(58) Field of Classification Search
USPC ........ 348/218.1, 153, 159, 572, 714, 187, 35, 348/36, 716, 718, 383, 231.99
See application file for complete search history.

(56) References Cited

U.S. PATENT DOCUMENTS

| 3,255,304 A | 6/1966 | Dischert et al. |
| 3,447,874 A | 6/1969 | Back |
| 3,858,063 A | 12/1974 | Saleme |

(Continued)

FOREIGN PATENT DOCUMENTS

| DE | 3417016 | 5/1984 |
| DE | 19502276 | 1/1995 |

(Continued)

OTHER PUBLICATIONS

Donglai Xu et al.; "An FPGA-Based Low-Cost Frame Grabber for Image Processing Application"; Electronics, Circuits, and Systems, 2000, 7th IEEE International conference; Dec. 17-20, 2000; pp. 333-336.

(Continued)

*Primary Examiner* — Victor Kostak
(74) *Attorney, Agent, or Firm* — Stolowitz Ford Cowger LLP (57) ABSTRACT A system is presented that applies M×N×K computational units to calculating image parameters on N picture images captured simultaneously by N digital camera devices, where there are N groups of frame grabber units, each containing M frame grabbers in which there are K computational units. The data operated on by a computational unit is separate and independent from the image data operated on by the other computational units. This results in a performance speedup of M×N×K compared to one computational unit making the same computations. A master frame grabber unit controls the illumination of the N digital camera devices, and synchronizes the illumination with the clocks of the N digital camera devices.

20 Claims, 9 Drawing Sheets

(56) References Cited

U.S. PATENT DOCUMENTS

| | | | |
|---|---|---|---|
| 4,167,022 A | 9/1979 | Dischert et al. | |
| 4,298,944 A | 11/1981 | Stoub et al. | |
| 4,326,219 A | 4/1982 | Griesshaber et al. | |
| 4,384,769 A | 5/1983 | Brei et al. | |
| 4,507,683 A | 3/1985 | Griesshaber et al. | |
| 4,612,666 A | 9/1986 | King | |
| 4,620,790 A | 11/1986 | Hufnagel | |
| 4,760,447 A | 7/1988 | Koka et al. | |
| 4,991,007 A | 2/1991 | Corley | |
| 5,033,015 A | 7/1991 | Zwirn | |
| 5,047,260 A | 9/1991 | Durand | |
| 5,142,648 A * | 8/1992 | Fitts et al. | 382/108 |
| 5,159,455 A * | 10/1992 | Cox et al. | 348/218.1 |
| 5,179,437 A | 1/1993 | Kawada et al. | |
| 5,237,408 A * | 8/1993 | Blum et al. | 348/154 |
| 5,257,092 A | 10/1993 | Noguchi et al. | |
| 5,263,120 A * | 11/1993 | Bickel | 706/62 |
| 5,267,038 A | 11/1993 | Fister | |
| 5,270,961 A | 12/1993 | Bajat et al. | |
| 5,304,809 A | 4/1994 | Wickersheim | |
| 5,327,226 A | 7/1994 | Tanabe | |
| 5,389,774 A | 2/1995 | Gelman et al. | |
| 5,467,128 A | 11/1995 | Yates et al. | |
| 5,489,771 A | 2/1996 | Beach et al. | |
| 5,495,329 A | 2/1996 | Anderson et al. | |
| 5,649,258 A | 7/1997 | Bergstresser et al. | |
| 5,673,083 A | 9/1997 | Izumi et al. | |
| 5,699,440 A | 12/1997 | Carmeli | |
| 5,745,126 A | 4/1998 | Jain et al. | |
| 5,748,230 A | 5/1998 | Orlando et al. | |
| 5,753,931 A * | 5/1998 | Borchers et al. | 250/559.22 |
| 5,760,829 A | 6/1998 | Sussmeier | |
| 5,781,351 A | 7/1998 | Murakami et al. | |
| 5,825,495 A * | 10/1998 | Huber | 356/600 |
| 5,867,250 A * | 2/1999 | Baron | 351/212 |
| 5,880,586 A | 3/1999 | Dukart et al. | |
| 5,906,682 A | 5/1999 | Bouras et al. | |
| 5,953,055 A * | 9/1999 | Huang et al. | 348/155 |
| 5,960,081 A | 9/1999 | Vynne et al. | |
| 5,998,867 A | 12/1999 | Jensen et al. | |
| 5,999,251 A | 12/1999 | Teramoto et al. | |
| 6,005,704 A * | 12/1999 | Chmielewski et al. | 359/210.1 |
| 6,041,336 A | 3/2000 | Steinlechner | |
| 6,075,601 A | 6/2000 | Marcus et al. | |
| 6,111,243 A | 8/2000 | Lara | |
| 6,118,886 A * | 9/2000 | Baumgart et al. | 382/103 |
| 6,153,985 A | 11/2000 | Grossman | |
| 6,177,986 B1 | 1/2001 | Stockton | |
| 6,184,675 B1 | 2/2001 | Bannai | |
| 6,195,159 B1 | 2/2001 | MacDonald et al. | |
| 6,198,838 B1 * | 3/2001 | Roehrig et al. | 382/132 |
| 6,201,600 B1 | 3/2001 | Sites et al. | |
| 6,205,244 B1 | 3/2001 | Bawolek et al. | |
| 6,219,443 B1 | 4/2001 | Lawrence | |
| 6,232,766 B1 | 5/2001 | Saouli et al. | |
| 6,313,652 B1 | 11/2001 | Maeng | |
| 6,366,312 B1 | 4/2002 | Crittenden | |
| 6,389,687 B1 | 5/2002 | Glenn | |
| 6,424,843 B1 | 7/2002 | Reitmaa et al. | |
| 6,427,078 B1 | 7/2002 | Wilska et al. | |
| 6,473,062 B1 | 10/2002 | Debiez et al. | |
| 6,476,417 B2 | 11/2002 | Honda et al. | |
| 6,480,346 B2 | 11/2002 | Funakoshi | |
| 6,512,587 B1 | 1/2003 | Marcus et al. | |
| 6,518,656 B1 | 2/2003 | Nakayama et al. | |
| 6,678,394 B1 | 1/2004 | Nichani | |
| 6,686,588 B1 | 2/2004 | Webster et al. | |
| 6,701,002 B1 | 3/2004 | Karube | |
| 6,714,241 B2 | 3/2004 | Baer | |
| 6,741,277 B1 | 5/2004 | Rau | |
| 6,759,814 B2 | 7/2004 | Vogel et al. | |
| 6,788,390 B2 | 9/2004 | Tanaka | |
| 6,798,450 B2 | 9/2004 | Baer | |
| 6,807,232 B2 | 10/2004 | Nicholson et al. | |
| 6,809,330 B2 | 10/2004 | Krohn et al. | |
| 6,822,657 B2 | 11/2004 | Baer | |
| 6,940,998 B2 | 9/2005 | Garoutte | |
| 6,969,843 B1 | 11/2005 | Beach | |
| 7,015,951 B1 | 3/2006 | Yoshigahara et al. | |
| 7,030,926 B2 | 4/2006 | Miyake et al. | |
| 7,068,302 B2 | 6/2006 | Ebenstein et al. | |
| 7,071,966 B2 | 7/2006 | Lu et al. | |
| 7,103,208 B2 | 9/2006 | Wengender et al. | |
| 7,126,630 B1 * | 10/2006 | Lee et al. | 348/218.1 |
| 7,136,157 B2 | 11/2006 | Gomm et al. | |
| 7,151,560 B2 | 12/2006 | Matherson et al. | |
| 7,155,119 B2 | 12/2006 | Knoedgen et al. | |
| 7,158,170 B2 | 1/2007 | Gustavsson et al. | |
| 7,188,036 B2 | 3/2007 | Strittmatter | |
| 7,200,497 B2 | 4/2007 | Wang et al. | |
| 7,215,374 B2 | 5/2007 | Why et al. | |
| 7,248,284 B2 | 7/2007 | Pierce | |
| 7,248,347 B2 | 7/2007 | Knoedgen et al. | |
| 7,265,781 B2 | 9/2007 | Noguchi et al. | |
| 7,403,229 B2 | 7/2008 | Knoedgen et al. | |
| 7,405,764 B2 | 7/2008 | Gustavsson et al. | |
| 7,426,316 B2 | 9/2008 | Vehvilainen | |
| 7,486,309 B2 | 2/2009 | Knoedgen et al. | |
| 7,505,064 B2 | 3/2009 | Knoedgen et al. | |
| 7,812,858 B2 | 10/2010 | Knoedgen et al. | |
| 7,948,519 B2 | 5/2011 | Knoedgen et al. | |
| 7,965,316 B2 | 6/2011 | Knoedgen et al. | |
| 8,068,182 B2 | 11/2011 | Knoedgen et al. | |
| 8,274,599 B2 | 9/2012 | Gustavsson et al. | |
| 2001/0050721 A1 | 12/2001 | Miyake | |
| 2002/0006687 A1 | 1/2002 | Lam | |
| 2002/0044215 A1 | 4/2002 | Takagi et al. | |
| 2002/0076088 A1 * | 6/2002 | Tsai | 382/118 |
| 2002/0080266 A1 | 6/2002 | Shinamiya et al. | |
| 2002/0093585 A1 | 7/2002 | Lemstrom et al. | |
| 2002/0113878 A1 | 8/2002 | Iwai et al. | |
| 2002/0126285 A1 | 9/2002 | Gilmore et al. | |
| 2002/0167605 A1 | 11/2002 | Akimoto et al. | |
| 2002/0186311 A1 * | 12/2002 | Sevat et al. | 348/283 |
| 2002/0191973 A1 | 12/2002 | Hofer et al. | |
| 2003/0002749 A1 | 1/2003 | Vehvilainen | |
| 2003/0007084 A1 | 1/2003 | Nakjoh | |
| 2003/0030648 A1 | 2/2003 | Baer | |
| 2003/0044042 A1 * | 3/2003 | King et al. | 382/100 |
| 2003/0048375 A1 | 3/2003 | Seim | |
| 2003/0067595 A1 | 4/2003 | Alderson et al. | |
| 2003/0112360 A1 | 6/2003 | Liao et al. | |
| 2003/0142374 A1 | 7/2003 | Silverstein | |
| 2003/0146976 A1 | 8/2003 | Liu | |
| 2003/0161163 A1 | 8/2003 | Hussey et al. | |
| 2003/0193604 A1 | 10/2003 | Robins et al. | |
| 2003/0214727 A1 | 11/2003 | Min et al. | |
| 2003/0218688 A1 | 11/2003 | Shaw et al. | |
| 2003/0221042 A1 | 11/2003 | Watkins et al. | |
| 2003/0223008 A1 | 12/2003 | Kim et al. | |
| 2004/0012688 A1 | 1/2004 | Tinnerino et al. | |
| 2004/0013420 A1 | 1/2004 | Hara | |
| 2004/0027456 A1 | 2/2004 | Pierce | |
| 2004/0032496 A1 | 2/2004 | Ebenstein et al. | |
| 2004/0058487 A1 | 3/2004 | Eslamy et al. | |
| 2004/0113047 A1 | 6/2004 | Tu | |
| 2004/0126005 A1 | 7/2004 | Duvdevani et al. | |
| 2004/0135907 A1 * | 7/2004 | Krohn et al. | 348/254 |
| 2004/0189812 A1 | 9/2004 | Gustavsson et al. | |
| 2005/0093990 A1 * | 5/2005 | Aoyama | 348/222.1 |
| 2005/0162517 A1 | 7/2005 | Fujihara et al. | |
| 2005/0219365 A1 | 10/2005 | DiCarlo et al. | |
| 2005/0231596 A1 | 10/2005 | Marchese | |
| 2005/0285973 A1 | 12/2005 | Singh | |
| 2006/0038916 A1 | 2/2006 | Knoedgen et al. | |
| 2006/0077259 A1 | 4/2006 | Knoedgen et al. | |
| 2007/0091334 A1 | 4/2007 | Yamaguchi et al. | |
| 2008/0049127 A1 | 2/2008 | Maeda et al. | |
| 2009/0167869 A1 | 7/2009 | Knoedgen et al. | |

FOREIGN PATENT DOCUMENTS

| | | |
|---|---|---|
| EP | 393848 | 10/1990 |
| EP | 599175 | 6/1994 |

(56) References Cited

FOREIGN PATENT DOCUMENTS

| | | |
|---|---|---|
| EP | 656731 | 7/1995 |
| EP | 679932 | 11/1995 |
| EP | 819927 | 1/1998 |
| EP | 1071944 | 3/2001 |
| EP | 1180718 | 2/2002 |
| EP | 1286553 | 2/2003 |
| EP | 348996 | 10/2003 |
| EP | 1382194 | 1/2004 |
| EP | 1389878 | 2/2004 |
| EP | 785439 | 4/2004 |
| EP | 463342 | 9/2004 |
| GB | 2426813 | 12/2006 |
| JP | 63056927 | 3/1988 |
| JP | 2197870 | 8/1990 |
| JP | 3099376 | 4/1991 |
| JP | 2002128088 | 8/2001 |
| JP | 2001292461 | 10/2001 |
| JP | 2002077955 | 3/2002 |
| JP | 200232918 | 8/2002 |
| JP | 12003270292 | 9/2002 |
| JP | 2002290994 | 10/2002 |
| JP | 2002345001 | 11/2002 |
| JP | 22003051973 | 2/2003 |
| JP | 2003101823 | 4/2003 |
| JP | 2003157425 | 5/2003 |
| JP | 2003179949 | 5/2003 |
| JP | 2003035746 | 7/2003 |
| JP | 2003219436 | 7/2003 |
| JP | 3902487 | 9/2003 |
| JP | 2003259126 | 9/2003 |
| JP | 2004226462 | 8/2004 |
| KR | 20030052216 | 6/2003 |
| WO | WO0191193 | 11/2001 |
| WO | WO02102060 | 12/2002 |
| WO | WO03096761 | 11/2003 |

OTHER PUBLICATIONS

Fujitsu Automation Ltd XP-200319159 Camera Module Testing System CMT-102-V4; Oct. 2003.

Burr-Bown Corp. "XTR110. Precision voltage to Current converter/Transmitter"; 1993, XP-002319985; retrieved from internet url:http://www.pci-card.com/XTR110.pdf7.

M.L. Chithambo et al.; "A Pulsed Light-Emitting-Diode System for Stimulation of Luminescence"; XP-002319984; Meas. Sci. technology 11 (2000) 418-424; IOP Pub. Ltd.

B.T. Turko; "Low Smear CCD Camera for High Frame Rates" IEEE Transion Nuclear Sciences, No. 1, vol. 36, Feb. 1989; 1989 IEEE pp. 165-169.

Merklinger, Harold; "The In's and Out's of Focus"; Aug. 1, 1990; Canada; XP002316955 ISBN:0-9695025-0-8; Internet Edition; 92 pages.

Stolowitz Ford Cowger LLP; Related Case Listing; Oct. 21, 2011; 2 pages.

\* cited by examiner

MULTIPLE FRAME GRABBER

RELATED PATENT APPLICATION

This is a continuation of U.S. patent application Ser. No. 12/456,925, filed on Jun. 24, 2009, now issued as U.S. Pat. No. 8,068,182, which is a divisional application of U.S. patent application Ser. No. 10/980,481, filed on Nov. 3, 2004, now issued as U.S. Pat. No. 7,567,273, all of which is herein incorporated by reference in its entirety.

This application is related to U.S. patent application Ser. No. 10/930,351, filed on Aug. 31, 2004, now issued as U.S. Pat. No. 7,486,309.

This application is related to U.S. patent application Ser. No. 10/929,651, filed on Aug. 30, 2004, now issued as U.S. Pat. No. 7,505,064.

This application is related to U.S. patent application Ser. No. 10/930,353, filed on Aug. 31, 2004, now issued as US Patent Publication No. 2006/0038916.

This application is related to U.S. patent application Ser. No. 10/929,652, filed on Aug. 30, 2004, now issued as U.S. Pat. No. 7,155,119.

This application is related to U.S. patent application Ser. No. 10/929,300, filed on Aug. 30, 2004, now issued as U.S. Pat. No. 7,248,347.

This application is related to U.S. patent application Ser. No. 10/929,653, filed on Aug. 30, 2004, now issued U.S. Pat. No. 7,403,229.

BACKGROUND OF THE INVENTION

1. Field of Invention

The present invention is related to the testing of light sensitive devices and in particular to performing tests on digital camera and light sensor devices at a wafer level or a packaged module level.

2. Description of Related Art

The digital camera is becoming a ubiquitous device. Not only are digital cameras replacing the traditional film camera, digital camera devices are being used in many other applications, such as small electronic devices, such as PDA (personal data assistant) and cellular phones. With the explosion of cellular phones, the ability to take a picture and then send that picture to another individual using a second cellular phone comes the need to produce inexpensive digital camera modules and efficiently test these modules in large quantities. This is further complicated by the many different module configurations that are emerging as a result of the many different application requirements, including fixed focus, manual focus and automatic focus as well as physical size. The testing time for digital camera module, which can have mega-pixel capability, has traditionally been a relatively long process (approximately sixty seconds for a module with 0.3 megapixels) to insure the integrity and picture quality of the camera. This necessitates a testing capability, which insures the integrity and specification of the digital camera module, and which is quick and handles a large quantity of modules.

A patent application Ser. No. 10/417,317 dated Apr. 16, 2003, is related to miniature cameras and their manufacturing methods that are used as built-in modules in hand held consumer electronics devices such as mobile phones and PDA's. In a second patent application Ser. No. 10/434,743 dated May 8, 2003, a test system is described for digital camera modules used as built-in modules for consumer electronics, which performs electrical tests, adjustment of focus and sealing of the lens barrel with glue.

In addition there are a number of other prior art patents that are directed to testing of digital cameras: US 20040032496A1 (Eberstein et al.) is directed to a method of camera calibration and quality testing; EP 1389878A1 (Bednarz et al.) is directed to a method of camera calibration and testing camera quality; US 20040027456A1 (Pierce) directed to the use of calibration targets; EP 1382194A1 (Baer) is directed to dark current subtraction; JP 2003259126 (Keisuke) is directed to remove noise of an image; US 20030146976A1 (Liu) directed to a digital camera system enabling remote monitoring; JP 2003219436 (Fuminori) is directed to adjustment of a pixel shift camera; US 2003142374 (Silverstein) is directed to calibrating output of an image output device; JP 2003179949 (Hidetoshi) is directed to a luminance level inspection apparatus; JP 2003157425 (Vehvilainen) is directed to improving image quality produced in a mobile imaging phone; JP 2003101823 (Kenichi) is directed to specifying a picture data area; EP 1286553 A2 (Baer) is directed to a method and apparatus for improving image quality; US 20030030648 (Baer) is directed to a method and apparatus for improving image quality in digital cameras; U.S. Pat. No. 6,512,587 (Marcus et al.) is directed to measurement method and apparatus of an imager assembly; US 20030002749 (Vehvilainen) is directed to a method and apparatus for improving image quality; US 20020191973 A1 (Hofer et al.) is directed to a method and apparatus for focus error reduction; WO 2002102060 A1 (Baer) is directed to a method and apparatus for smear in digital images using a frame transfer sensor; JP 2002290994 (Hidetoshi) is directed to a method and apparatus to detect foreign matter on the surface of a lens; JP 200223918 (Yanshinao) is directed to an image inspection device and method, for a camera module; JP 2002077955 (Keisuke) is directed to a method and apparatus for evaluating camera characteristics; JP 2001292461 (Keisuke) is directed to a system and method for evaluating a camera; U.S. Pat. No. 6,219,443 B1 (Lawrence) is directed to a method and apparatus for inspecting a display using a low resolution camera; U.S. Pat. No. 6,201,600B1 (Sites et al.) is directed to a method and apparatus for inspection of optically transmissive objects having a lens; U.S. Pat. No. 5,649,258 (Bergstresser et al.) is directed to an apparatus and testing of a camera; EP 0679932 B1 (Kobayashi et al.) is directed to testing an electronically controlled camera; U.S. Pat. No. 5,179,437 (Kawada et al.) is directed to an apparatus for color correction of image signals of a color television camera; JP 03099376 (Hiroshi) is directed to the quality of a display screen; U.S. Pat. No. 4,612,666 (King) is directed to a pattern recognition apparatus; and U.S. Pat. No. 4,298,944 Stoub et al.) is directed to a method and apparatus for distortion correction for scintillation cameras.

SUMMARY OF THE INVENTION

It is an objective of the present invention to use parallel processing to compute image parameters on one or more digital camera devices under test.

It is also an objective of the present invention to compute image parameters of a plurality of digital camera devices simultaneously.

It is further an objective of the present invention to use a plurality of groups of frame grabber units containing a plurality of computational units to capture images and calculate image parameters.

It is still further an objective of the present invention to distribute an image to computational units within a frame grabber unit by pixel or group of pixels.

It is also further an objective of the present invention to control and illuminate a plurality of digital camera devices simultaneously to perform the same sequence of tests from which image data is created to be analyzed by the plurality of computational units in the plurality of frame grabber units.

It is also still further an objective of the present invention to illuminate a plurality of digital camera devices with the same light source controlled by one frame grabber unit of the plurality of frame grabbers, whereby a first set of pictures are captured by the plurality of digital camera devices and the light source is controlled to wait until a second set of pictures are ready to be taken.

It is still further an objective of the present invention to illuminate a plurality of light sensors in chip form on a wafer, or in a packaged form, with a light system similar to that described herein, controlled by a frame grabber unit or a light control unit, and wherein the light source produces a light pulse having a defined color, shape, intensity, duration and repetition.

In the present invention a computational unit comprises a memory controlled by a field programmable gate array (FPGA), and a CPU that accesses the memory to access image data from a digital camera device under test (DUT) and returns calculated results to the memory. The memory is coupled to a host computer to which the computed results are coupled for combining into a final result and allow a decision pertaining to the quality of the DUT that produced the image data.

The frame grabber controls the light source that is used to illuminate the DUT, synchronizing the light source with the DUT and connecting resulting image data to a frame grabber unit. The frame grabber unit comprises a plurality of computational units. Each computational unit operates on data that is independent from other computational units and allowing parallel processing of the image data with no serial overhead other than the initial loading of each memory in each computational unit. Computation can begin when the first pixel is loaded into a memory, allowing additional loading of the memory to be performed while computation of a part of an image is being done.

A plurality of frame grabber units are coupled to a plurality of digital camera devices (N-DUT) with one frame grabber, considered a master, controlling the source of light that illuminates the plurality of digital camera devices. A plurality of images are captured by the N-DUT are coupled to the plurality of frame grabber units for computation. A plurality of images are created by the N-DUT to be load the memories of the plurality of frame grabber units. So as not to impede the test process, the light source has a fast turn-on, turn-off and repetition throughout the change of colors and the shape of the light pulse. The plurality of images captured by the N-DUT are distributed across the plurality of frame grabber units in such a way that all frame grabber units are operating on pixels of the same image while additional images are created and delivered to the memories of the frame grabber units.

The DUT is a light sensitive semiconductor device located on a semiconductor wafer, or a carrier of unmounted devices, or the DUT can be a module that has been assembled with a light sensitive device. When a plurality of N-DUT is tested on a wafer or physically similar holding device, a single light source can be used to illuminate all devices at the same time. When a there is a plurality of part numbers located on separate carrying devices, a separate light source may be required where each separate light source is controlled by a separate "master" frame grabber. In the case of modules the physical distance of the test stations may be far enough apart as to require separate light sources, even though the modules are of the same part number.

When distributing a picture image by individual pixel, the P pixels are coupled to M frame grabber units, each of which contains K computational units. Computation on each pixel begins as soon as each pixel is loaded into the memory of each computational unit. A first pixel P=1 is coupled to a first computational unit K=1 of a first frame grabber unit M=1, and computation is started. A P=2 pixel is coupled to a first computational unit K=1 of second frame grabber unit M=2, and computation is started. A P=M pixel is then coupled to a first computational unit K=1 in an M frame grabber unit, and computation is started. Then a P=M+1 pixel is coupled to the K=2 computational unit of the M=1 frame grabber unit, and computation is started in the K=2 computational unit. The coupling process continues until M×K pixels have been coupled to all K computation units in the M frame grabber units. Then the P=M.times.K+1 pixel is coupled to the memory of the K=1 computational unit of the M=1 frame grabber unit. The coupling of pixels continues until the last pixel of a picture has been coupled to one of the M×K computational units. When the calculations on the P=1 pixel is completed the processor in the K=1 computational unit commences calculations on P=M×K+1 pixel. The overlap of computation and the loading pixels into computational units allows additional time to make calculations. It should be noted that groups of pixels forming a line, column or cluster can be coupled to the M frame grabber units in a fashion similar to that of coupling a pixel; however the start of computation will not be fully overlapped with the coupling process until all the M frame grabber units have been loaded with an initial group of pixels.

Alternatively, a P=1 pixel is coupled to a K=1 computational unit of the M=1 frame grabber unit, the P=2 pixel is coupled to a K=2 computational unit of the M=1 frame grabber unit and continuing until a P=K pixel is coupled to the K computational unit of the M=1 frame grabber unit. Each time a pixel is loaded into the memory of a computational unit, calculation of the parameters of the pixel is started. The P=K+1 pixel is coupled to the K=1 computational unit of the M=2 frame grabber unit. The P=2K pixel is coupled to the K computational unit of the M=2 frame grabber unit and the coupling of pixels to the frame grabber units continues until the P=M×K pixel is coupled to the K computational unit of the M frame grabber unit. The P=M×K+1 pixel is then loaded into the memory of the K=1 computational unit of the M=1 frame grabber unit. If the calculations being performed on the K=1 pixel are completed, the processor of the K=1 computational unit commences computation on the P=M×K+1 pixel. The process of coupling pixels to the computational units continues until the last pixel of a picture image is coupled to a computational unit of the M×K computational units. Calculations in each M×K computational unit on the next pixel commences when the calculations on the pixel previously loaded in a computational unit are completed.

Additional frame grabber units and computational units can be added along with additional memory to allow for an increase in the number of pixels, i.e. mega pixels and multiple mega pixels, in a picture image so that calculation time for picture images of higher pixel count is controlled to be within an acceptable time. Also, a single light comprising of a set of minors can be used to provide illumination to devices that are remote from each other and would otherwise require separate light sources. This reduces the variability that can occur between a plurality light sources and the need to calibrate a plurality of light sources to produce the same simultaneous.

Light sensors, which are not camera devices, in either wafer or package form can be illuminated with a light source similar to the one described herein. Where a frame grabber, or a similar control unit, controls a light source for intensity, color, shape, duration and repetition, with or without the use of mirrors to spread the light from a single light source over physical distances, to produce an illumination to enable the testing of the light sensors.

BRIEF DESCRIPTION OF THE DRAWINGS

This invention will be described with reference to the accompanying drawings, wherein.

DETAILED DESCRIPTION OF THE PREFERRED EMBODIMENT

Figure 1A:
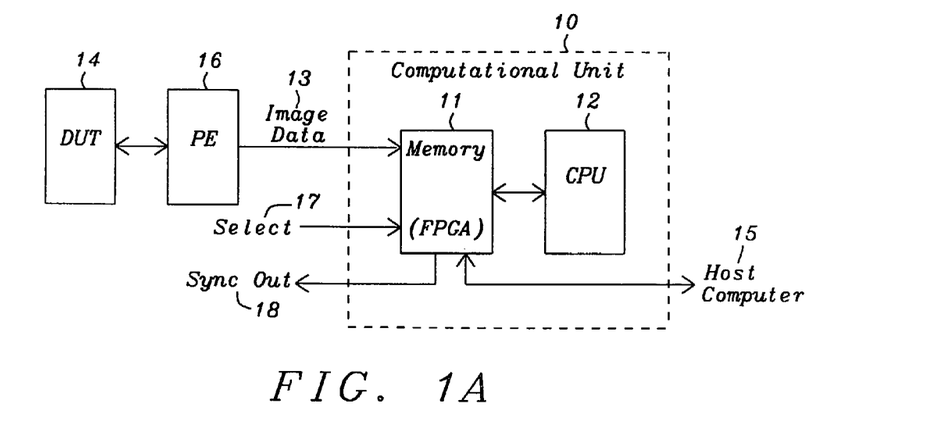
FIG. 1A is a block diagram of the present invention showing a computational unit coupled to a device under test.

In FIG. 1A is shown a computational unit 10 of the present invention. A memory 11 containing a field programmable gate array (FPGA) is used to store image data 13 resulting from a light sensitive device such as a digital camera device under test (DUT) 14, where the FPGA controls the operation of the memory. The DUT can be a light sensitive semiconductor chip or a module containing the chip. A pin electronics unit (PE) 16 interfaces with the DUT 14 to provide signals and power to the DUT and receives analog and digital signals back from the DUT. An analog to digital converter (ADC) forms part of the PE 16 to convert analog image data from the DUT into a digital format that is stored in the memory 11. The memory is coupled to a CPU 12 to perform calculations on the image data stored in memory 11 to determine the capability of the DUT to sense the an image of light. Results from the calculations are stored back into the memory 11 and the results are accessed from a host computer 15 to determine a final composite test results. A select signal 17 is used to select the memory and a "sync out" 18 is used to synchronize the memory with the incoming stream of image data.

Figure 1B:
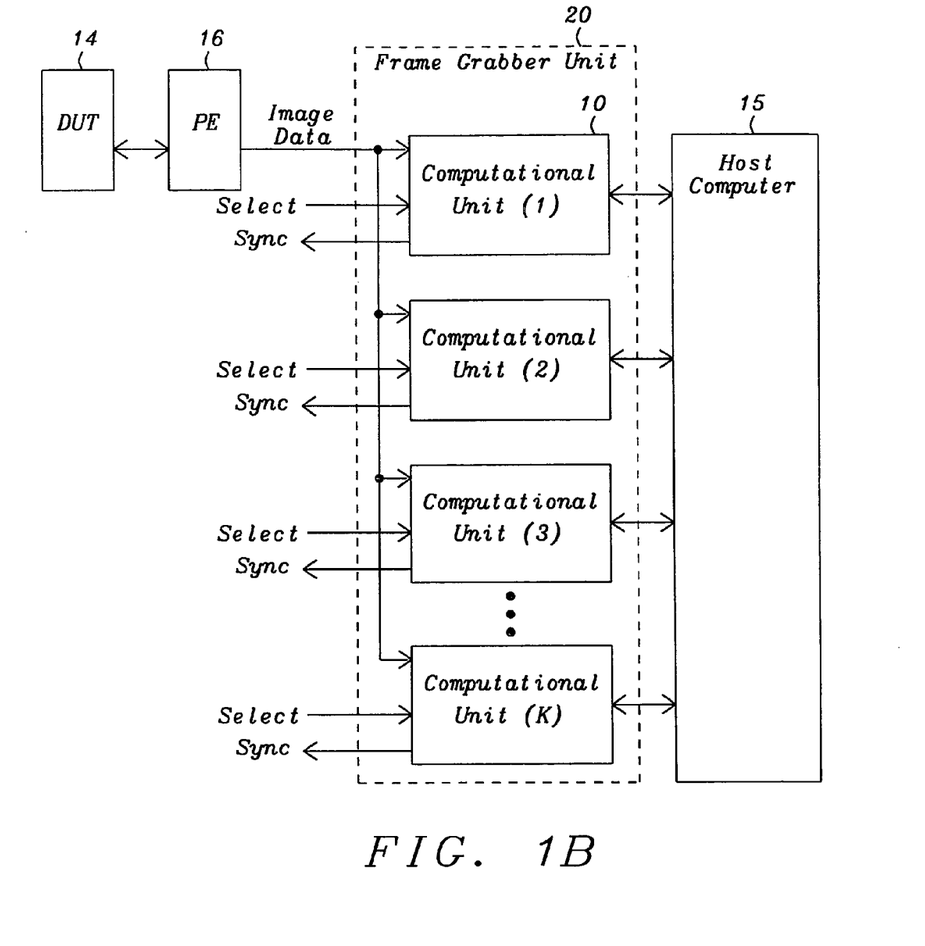
FIG. 1B is a block diagram of the present invention showing a plurality of computational units within a frame grabber unit coupled to a device under test.

In FIG. 1B is shown a frame grabber unit (FGU) 20 that contains a plurality of computational units 10 ranging from computational unit (1) to computational unit (K). A typical value for K is K=4, but K=8 or more can be used depending upon the size of the computational task such as images with megapixels. Each of the computational units 10 are coupled to the host computer 15, which gathers the results of the computations from each memory 11 in the computational units 10 to form a composite result to determine the capability of the DUT to capture images of light coupled to the DUT.

Continuing to refer to FIG. 1B, image data is streamed into the frame grabber unit 20 and each FPGA contained within each computational unit (10) through computational unit (K) selects a portion of that data and stores it into memory 11 within the computational unit. The image data selected can be by individual pixel or by a split of the of the picture image into groups of pixels. The image from the DUT can be scanned out by row or column of image pixels in a left to right, top to bottom or right to left, bottom to top direction. When the image data is split, individual groupings of pixels within an image split are stored into the memories of the computational units. The split of the image data is done in a number of portions and distributed to the computational units 10 within the frame grabber unit 20. The portions are by pixel or groups of pixels. The groups of pixels can be by rows of pixels, columns of pixels or clusters of pixels, which form a checkerboard like pattern on the image. Distributing the image by pixel allows additional computation time that can be done as additional pixels are coupled to the computational units.

Continuing to refer to FIG. 1B, the CPU 10 within each computational unit (10) through computational unit (K) then performs calculation on the data in memory 11 simultaneously and in parallel with all CPU 10. Many lengthy computations are performed comprising for example performing Fast Fourier Transform (FFT); determining the modulation transfer function (MTF) of the image versus the focus target, detecting noise including fixed pattern noise (FPN), cross talk between colors of light, test of the ADC in the PE16; detection of bad pixels, dark current, noise including fixed pattern noise (FPN) and cross talk between colors; resolution measurements of the optics in the test station; peak detection of the brightness of a pixel or portion of an image; averaging an image over several pixels; and detecting vignetting and distortion of the optics system. All of these computations that are necessary to determine a good digital camera device (DUT) require a very large number of computations. As the pixel density increases in digital camera devices, more computational power is required so as to contain the test time of the DUT.

Figure 2:
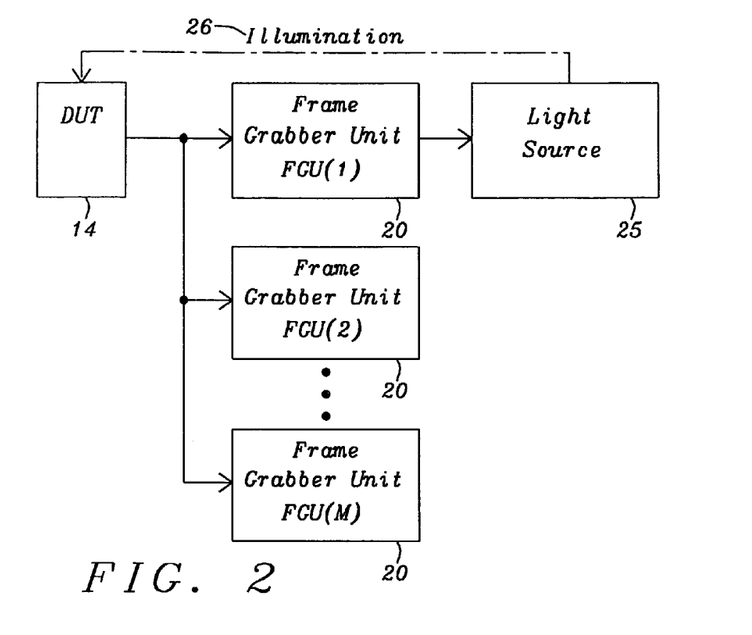
FIG. 2 is a block diagram of the present invention of a plurality of frame grabber units coupled to a single device under test.

In FIG. 2 is shown a block diagram of a plurality of frame grabber units 20, FGU(1) to FGU(M), coupled to a DUT 14. Frame grabber unit FGU(1) acts as a master and controls a light source 25 to illuminate 26 the DUT 14. The light source 25 is controlled for color, intensity, light pulse shape and repetitiveness and is controlled to produce narrow light pulses in the range of microseconds extending to milliseconds depending upon the test being performed. The light source can be run continuously, repeating the light pulse and or any programmed repetition of a sequence of light pulses. The master frame grabber FGU(1) synchronizes the light source with the clock of the DUT 14 so that an image of the light can be captured by the DUT. Each frame grabber unit 20, FGU(1) to FGU(M), contain a plurality of computational units 10 as shown in FIG. 1B. The picture image coupled from the DUT 14 to the frame grabber units FGU(1) to FGU(M) is divided into portions and distributed to the K computational units contained within each frame grabber unit 20.

Figure 3A:
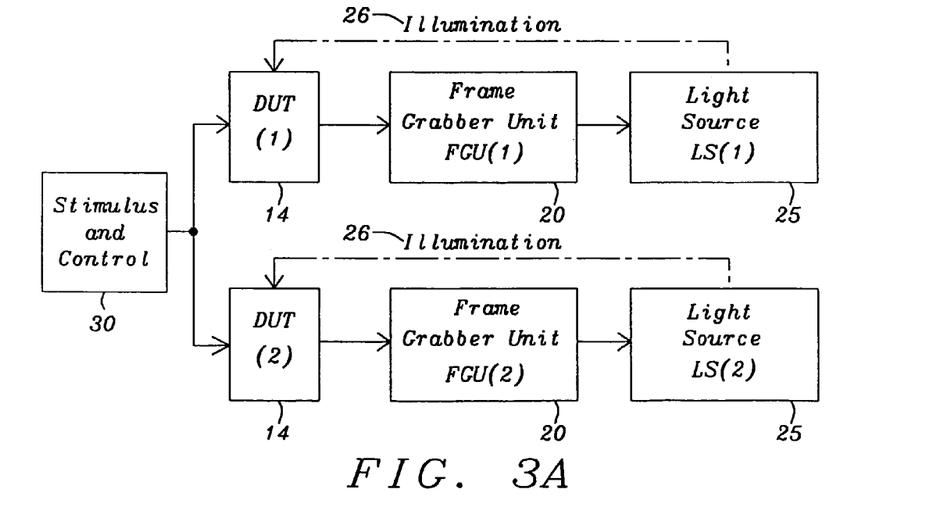
FIG. 3A is a block diagram of the present invention with two devices under test couple to separate light sources and frame grabber units.

In FIG. 3A is shown two DUT 14, DUT(1) and DUT(2). The two DUT 14 are each connected to separate frame grabber units 20, DUT(1) to frame grabber unit FGU(1) and DUT(2) to frame grabber unit FGU(2). The DUT 14 are controlled and provided signals from a stimulus and control unit 30. Each frame grabber unit 20 controls a separate light source 25, FGU(1) controls light source LS(1) to illuminate 26 DUT(1), and FGU(2) controls light source LS(2) to illuminate 26 DUT(2). The light sources 25 are controlled by each frame grabber unit 20 to be synchronous with the clock of each respective DUT 14. This arrangement is necessary when DUT(1) and DUT(2) cannot be positioned under the same light source as might be the case if the DUT is a physical module located in two physically separate test apparatus, or the two DUT are of different part numbers requiring a difference in the illumination. The frame grabber units 20, FGU(1) and FGU(2), contain a plurality of computational units 10 as shown in FIG. 1B that operate simultaneously in parallel on portions of a picture image to calculate the image parameters.

Figure 3B:
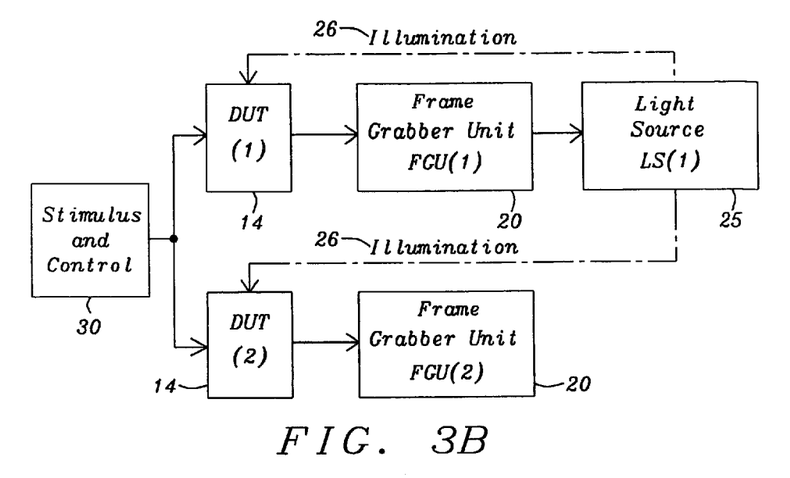
FIG. 3B is a block diagram of the present invention with two devices under test couple to the same light source and separate frame grabber units.

In FIG. 3B there are two DUT 14, DUT(1) and DUT(2), controlled by the stimulus and control unit 30. DUT(1) is coupled to a frame grabber unit FGU(1) 20, which acts as a master for control of the light source 25 illuminating 26 both DUT(1) and DUT(2), and FGU(2) is coupled to DUT(2). The master frame grabber FGU(1) synchronizes the clocks of DUT(1) and DUT(2) with the occurrence of the illumination 26 from the light source 25 so that an image of the light can be captured by both DUT(1) and DUT(2). The light source 25 produces fast light pulses ranging from microseconds to milliseconds of a color of light. The light source has a range of colors that must be quickly switched between so as to not impede the testing of the DUT. The range of colors comprise red, blue, green, infrared and any additional colors required in the testing of the DUT 14. Each frame grabber unit, FGU(1) and FGU(2), contain a plurality of computational units 10 as shown in FIG. 1B.

Figure 4A:
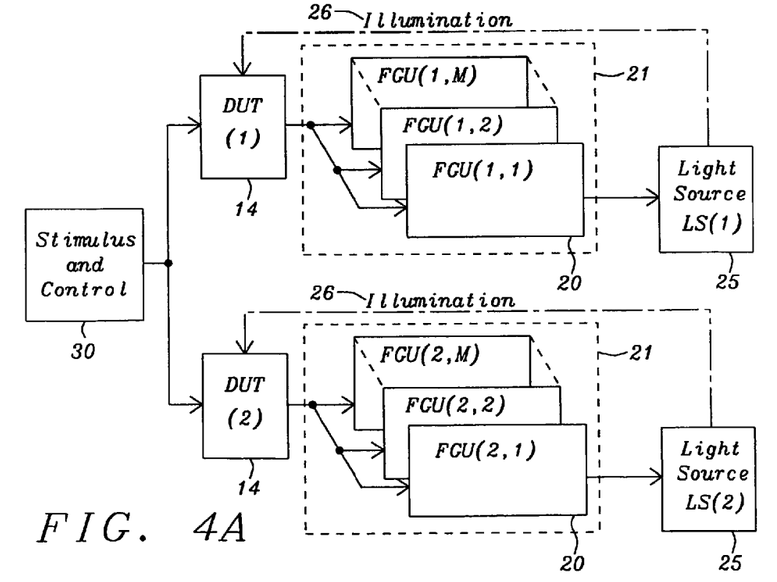
FIG. 4A is a block diagram of the present invention of two devices under test, each coupled to a plurality of frame grabber units and separate light sources.

FIG. 4A is a block diagram showing a plurality of frame grabber units 20 contained within in two groups of frame grabber units 21, each group 21 is connected to a DUT 14, DUT(1) and DUT(2). Each of frame grabber unit, FGU(1,1) to FGU(1,M) and FGU(2,1) to FGU(2,M) contain a plurality of computational units 10 as shown in FIG. 1B. The frame grabber unit FGU(1,1) acts as a master to control the light source 25 LS(1) to illuminate 26 DUT(1), and frame grabber unit FGU(2,1) acts as a master to control the light source 25 LS(2) to illuminate 26 DUT(2). The two DUT 14, DUT(1) and DUT(2), can be the same part number or different part numbers requiring separate light sources, or two devices or modules physically space such that a single light source cannot be used. The stimulus and control unit 30 provides control signals to the DUT (1) and DUT(2), which when illuminated by the light sources LS(1) and LS(2) produce a picture image that is coupled to the groups of frame grabber units 21. The Frame grabber unit FGU(1,1) synchronizes the occurrence of the illumination 26 with the clock of the DUT(1) and frame grabber unit (2,1) synchronizes the occurrence of the illumination 26 with the clock of the DUT(2). The picture data from DUT(1) is coupled to frame grabber units FGU(1,1) to FGU(1,M) and is distributed to the K computational units 10 (FIG. 1B) contained within each frame grabber unit in a fashion that divides the required calculations among the K computational units. In Like manner, the picture data from DUT(2) is coupled to frame grabber units FGU(2,1) to FGU(2,M) and is distributed to the K computational units contained within each frame grabber unit. Each computational unit 10 (FIG. 1A and 1B) operates in parallel, separately and independent of the other computational units to calculate the image parameters of the picture images from DUT(1) and DUT(2) producing a maximum parallel computational performance that is proportional to the number of computational units 10 that are being used.

Figure 4B:
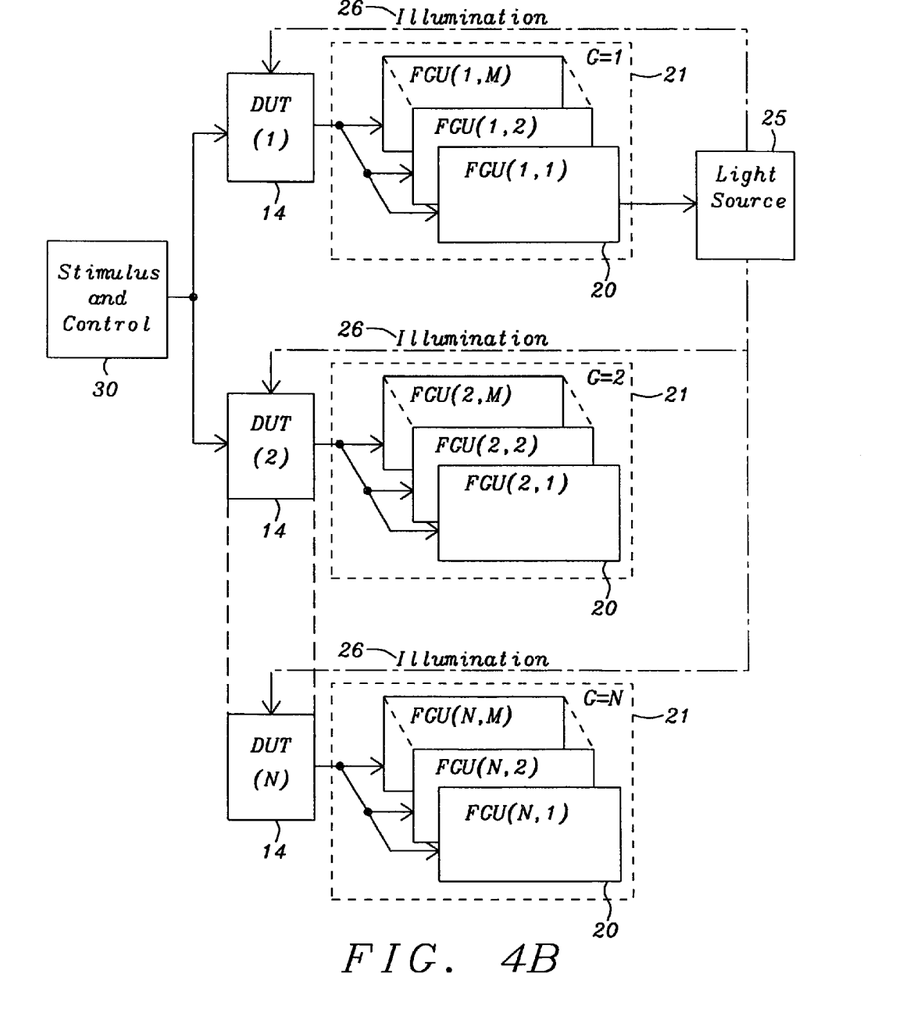
FIG. 4B is a block diagram of the present invention of a plurality of devices under test, each coupled to a plurality of frame grabber units and one light source.

FIG. 4B shows a configuration where a plurality of light sensitive devices under test 14, DUT(1), DUT(2) to DUT(N) are coupled to a plurality of groups of frame grabber units 21, G=1, G=2 to G=N. Within each group of frame grabber units 21 there are M frame grabber units 20, FGU(1,1) to FGU(1,M) in group G=1, FGU(2,1) to FGU(2,M) in group G=2 and FGU(N,1) to FGU(N,M) in group G=N. Each frame grabber unit 20, FGU(1,1) to FGU(1,M), FGU(2,1) to FGU(2,M) and FGU(N,1) to FGU(N,M), contain a plurality (1 to K) of computational units 10 as shown in FIG. 1B, which provides the computational power necessary to analyze a plurality of picture images to determine the capability of each DUT 14.

Continuing to refer to FIG. 4B, the image data is divided amongst the computational units 10 in each of the frame grabber units 20. For example, a portion P=1 of an image from DUT(1) is coupled to computational unit K=1 in frame grabber unit FGU(1,1), portion P=K is coupled to computational unit K in FGU(1,1), portion P=K+1 is coupled to computational unit K=1 in FGU(2,1), and portion P=M×K is coupled to computational unit K in FGU(1,M). The results of the computations are stored back into the memory 11 by each CPU 12 and read by a host computer 15 (FIG. 1A) to determine the composite result of each test performed on each DUT 14.

Continuing to refer to FIG. 4B, the frame grabber unit FGU(1,1) acts as a master to control the light source 25 that illuminates 26 each of the devices under test, DUT(1), DUT(2) to DUT(N). The devices under test 14 are digital camera devices of a single part number in a chip form located on a semiconductor wafer, for example, or can be in a module form, where each DUT 14 is physically spaced such that one light source can be used to illuminate all DUT simultaneously. The control of the light source 25 comprises selecting a color of light, selecting a pulse shape, intensity and duration, and synchronizing the occurrence of the resulting illumination 26 with the clock of the plurality of DUT 14 so that each DUT 14 can capture an image of the light. It is within the scope of this invention that there is a light source independently controlled for each DUT 14, DUT(1), DUT(2) to DUT(N), by a frame grabber unit 20 in each group, G=1, G=2 to G=N. For example, a separate light source for DUT(1) could be controlled by FGU(1,1), a light source for DUT(2) controlled by FGU(2,1) and a light source for DUT(N) controlled by FGU(N,1). Independent light sources might be required when distances are such that one light source cannot illuminate all of the devices 14. Also it should be noted that fewer than N light sources can be used, for example a light source 25 is controlled by FGU(1,1) for DUT(1) through DUT(N=4) and a second light source 25 is controlled by FGU(N=5,1) for DUT(N=5) to DUT(N).

Figure 5:
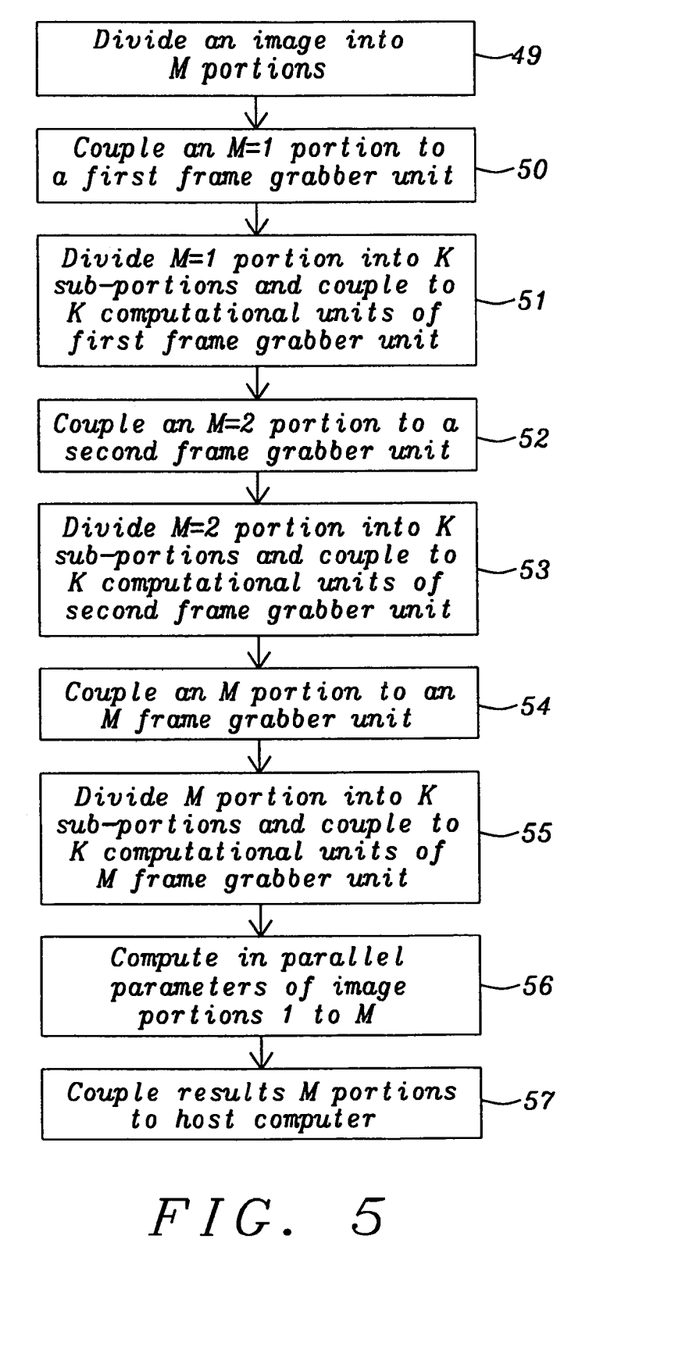
FIG. 5 is a flow diagram of a method of the present invention for coupling a plurality of images to a plurality of computational units in a plurality of frame grabber units.

In FIG. 5 is shown a method of computing the parameters of an image from a digital camera device (DUT). The image is divided into M portions 49. A first portion is coupled to an M=1 frame grabber unit 50, where M is the number of frame grabber units. The first portion is divided into K sub-portions and each of the K sub-portions are coupled to one of K computational units within the M=1 frame grabber unit 51, where K is the number of computational units within a frame grabber unit. A second portion is coupled to an M=2 frame grabber unit 52, and the second portion is divided into K sub-portions and each sub-portion is distributed to one of the K computational units contained within the M=2 frame grabber unit 53. An M portion is coupled to an M frame grabber unit 54. The M portion is divided into K sub-portions, and each sub-portion is distributed to one the K computational units contained within the M frame grabber unit 55. All K computational units within the M frame grabber units operate independently and in parallel to simultaneously compute the image parameters for M×K sub-portions of the M portions 56. This results in a computational speedup of M×K as compared to a single computation unit operating on the picture image. The results of the computations are stored back into the respective memories of the computational units and coupled to the host computer 57 for aggregating the computed results.

Figure 6:
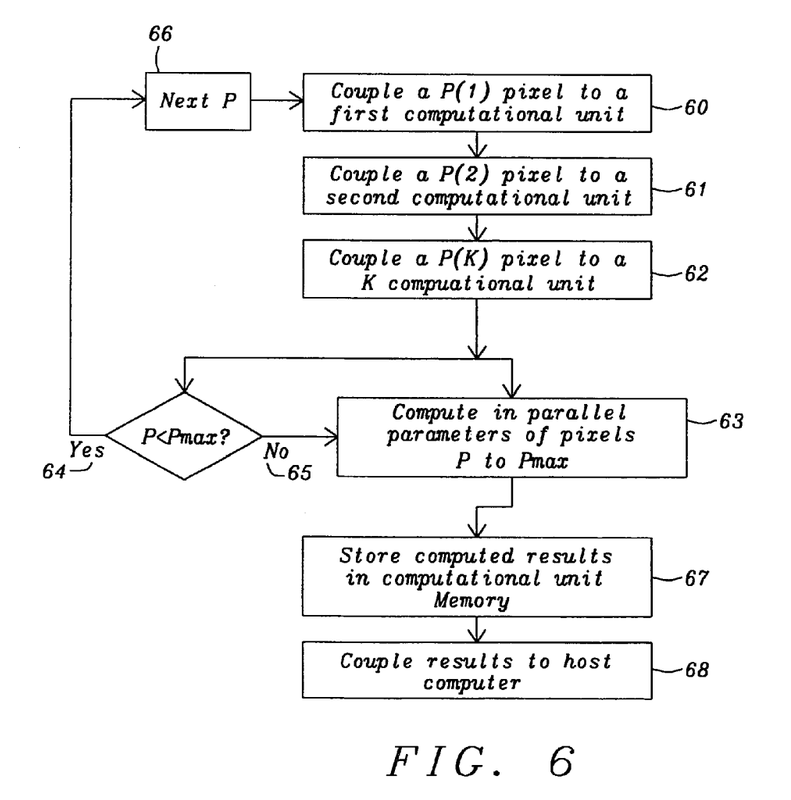
FIG. 6 is a flow diagram of a method of the present invention for coupling for coupling pixels of an image to a plurality of frame grabber units

In FIG. 6 is shown a method in which image data is loaded into a frame grabber unit such that each computational unit within the frame grabber unit computes on pixels distributed to the computational units. For example, a first pixel P(1) of an image that is loaded into a first computational unit 60, where P(1)=1, a second pixel is loaded into a second computational unit 61, where P(2)=2, and a K pixel P(K)=K is loaded into a K computational unit 62. Computation of the parameters of loaded pixels commences 63 while additional pixels of an image are loaded into the computational units 64, 66, 60, 61, and 62. The next pixel P(1)=K+1 is coupled to the first computational unit 60, pixel P(2)=K+2 is coupled to the second computational unit, and pixel P(K)=2K is loaded into the K computational unit. The loading of pixels continues until pixel P(K)=Pmax is loaded into a computational unit 65. The results of the computations are stored in the respective computational unit memory 67. For example, computed results for the first pixel is stored in the memory of the first computational unit and the computed results for the second pixel is stored in the memory of the second computational unit. When the computational process finishes, the results stored in the memories of the computational units are coupled to the host computer 68 where the results are combined and analyzed to provide a final composite test results.

Figure 7:
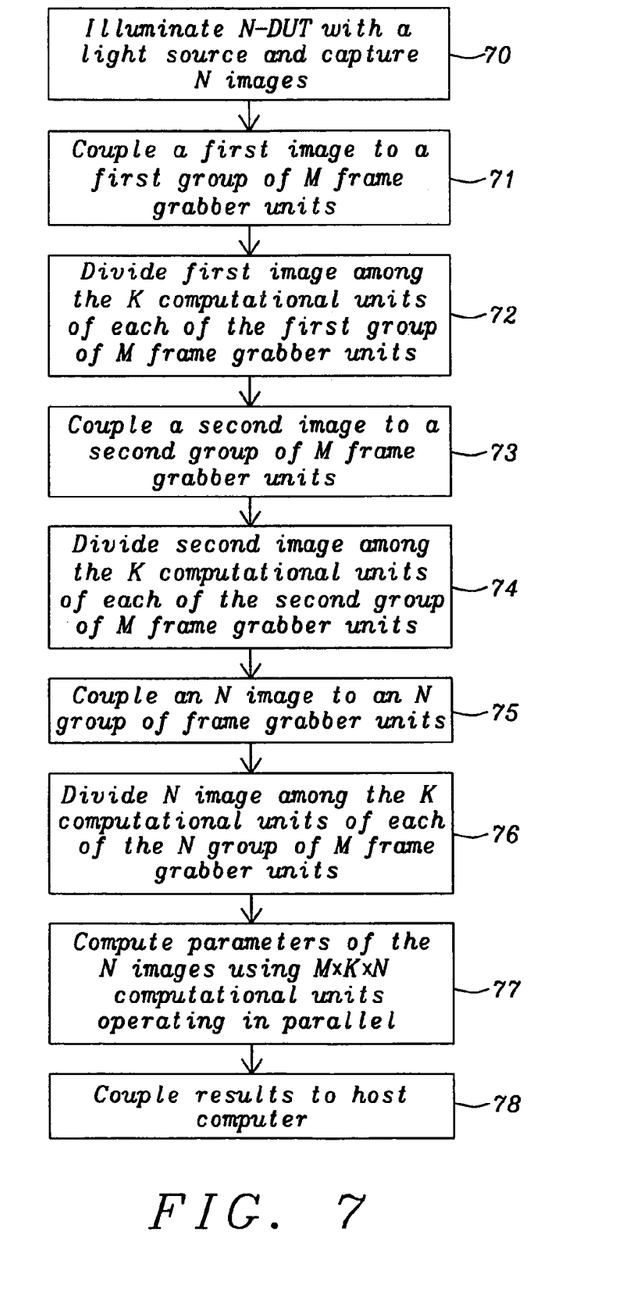
FIG. 7 is a flow diagram of a method of the present invention for coupling images from a plurality of devices under test to the computational units of a plurality of frame grabbers.

In FIG. 7 is shown a method for analyzing a plurality of N images created by a plurality of digital camera devices (N-DUT), DUT(1) through DUT(N), that are being tested simultaneously, where N is an integer representing a particular DUT. Referring to FIG. 1B and 4B along with FIG. 7, the N-DUT are illuminated with light from a light source and each N-DUT is controlled to capture an image of the light, totaling N images, one image for each DUT 70. A first image from DUT(1) is coupled to a first group (G=1) of frame grabber units 71. Each frame grabber unit FGU(1,1) through FGU(1,M) within group (G=1) contains K computational units. The first image is divided into portions P amongst each of the K computational units within each of the frame grabber units FGU(1,1) through FGU(1,M) 72. For example, a first portion (P=1) of the first image is coupled to the first computational unit (K=1) in frame grabber unit FGU(1,1), the second portion (P=2) of the first image is coupled to the second computational unit (K=2) of FGU(1,1), the P=K+1 image portion is coupled to the first computational unit K=1 of the frame grabber unit FGU(1,2), and so on until the last portion P=M×K of the first image is coupled to the last computational unit K of FGU(1,M), where the total image portions P is equal to the number of M frame grabber units times K computational units in each frame grabber unit, P=M×K.

Continuing to refer to FIG. 7, a second image from DUT(2) is coupled to a second group (G=2) frame grabber units 73. The second image is divided amongst each of K computational units of the second group (G=2) of M frame grabber units 74 in a similar fashion as was done for the first image. For example, a first image portion (P=1) of the second image is coupled to the first computational unit (K=1) in frame grabber unit FGU(2,1), the second portion (P=2) of the second image is coupled to the second computational unit (K=2) of FGU(2,1), the (P=K+1) image portion is coupled to the first computational unit (K=1) of the frame grabber unit FGU(2, 2), and so on until the last portion (P=M×K) of the first image is coupled to the last computational unit (K) of FGU(2,M), The process of coupling the images from the N digital camera devices continues until the image of the last DUT(N) is coupled to the frame grabber group (G=N) 75. The last image from the last DUT(N) is divided amongst each of K computational units of the last group (G=N) of M frame grabber units 76 in a similar fashion as was done for the image from DUT(1). For example, a first image portion (P=1) of the last image is coupled to the first computational unit (K=1) in frame grabber unit FGU(N,1), the second portion (P=2) of the last image is coupled to the second computational unit (K=2) of FGU(N,1), the (P=K+1) image portion is coupled to the first computational units (K=1) of the frame grabber unit FGU(N,2), and so on until the last portion (P=M×K) of the last image is coupled to the last computational unit K of FGU(N,M). The results of the computations are coupled to a host computer 78 for the combining of the results to determine the quality of the digital camera devices.

Continuing to refer to FIG. 7, there are P=M×K×N image portions that are calculated in parallel by M×K×N computational units. The portions of the image data are independent and separate from each other allowing each CPU 12 (FIG. 1A) to perform at a maximum computational rate. As the data is being loaded into each computational unit, computation commences on the loaded portion of the data as the remainder of the data is loaded to maximize the overlap of data loading and computation in order to improve total test time. The data can be loaded pixel by pixel. For example the first pixel (p=1) of an image is coupled to the first computational unit (K=1) of the frame grabber unit FGU(1,1), the second pixel (p=2) coupled to the second computational unit (K=2) of FGU(1,1), the (p=K) pixel coupled to the last computational unit K of FGU(1,1), the (p=K+1) pixel coupled to the first computational unit (K=1) of FGU(1,2), and the (p=K×M) pixel coupled to the computational unit K of FGU(1,M). Computation is started when the first pixel data is loaded while additional image data is loaded by coupling the (p=K×M+1) pixel into the first computational unit (K=1) of FGU(1,1), the (p=K×M+2) pixel into computational unit (K=2) of FGU(1, 1), the (p=K×(M+1)) pixel into computational unit K of FGU (1,1), the (p=K×(M+1)+1) pixel into computational unit (K=1) of FGU(1,2), so on until the (p=2K×M) pixel is coupled to the computational unit K of FGU(1,M), and returning to the first computational unit (K=1) in FGU(1,1) for the next pixel. This load a pixel and begin computing procedure provides a way to have a maximum overlap between loading image data and computing image parameters. An alternative to loading pixel by pixel is to load the computational units by row or column, groups of rows or columns, or other grouping of pixels such as groups of pixels clustered in a checkerboard fashion.

Figure 8:
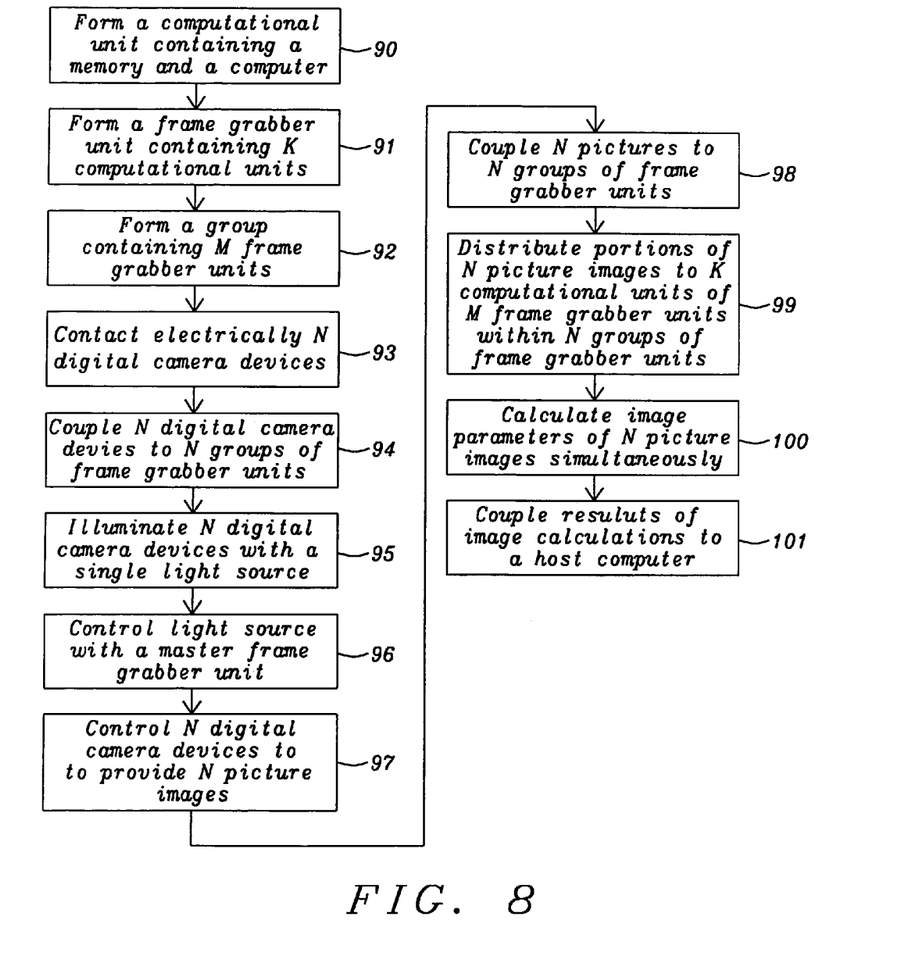
FIG. 8 is a flow diagram of a method of the present invention for coupling a plurality of digital camera devices to a same light source and a plurality of computational units to calculate image parameters.

In FIG. 8 is shown a method of performing image tests on a plurality of digital camera devices (N-DUT) simultaneously. A computational unit is formed containing a memory and a computer 90. A frame grabber unit is formed containing K computational units 91. A group of frame grabber units is formed containing M frame grabber units 92. Electrical contact is made to N-DUT 93 allowing N groups of frame grabber units to be coupled to the N-DUT 94. The N-DUT are illuminated by a single light source 95 controlled by a master frame grabber unit 96. The master frame grabber unit can be any of the M frame grabber units. The light source is controlled for light parameters comprising color, intensity, pulse shape, duration, and repetitiveness. The N-DUT are controlled to produce N picture images 97, and the N picture images are coupled to N groups of frame grabber units 98. Each of the N images is coupled to N groups of frame grabber units and is distributed to the K computational units contained within the M frame grabber units 99. Image parameters are calculated using the K computational units, operating simultaneously, that are located within each of the N groups of frame grabber units 100. The results of the computation are stored into the computational memories and coupled to a host computer for combining the final results to determine the quality of the N-DUT 101.

While the invention has been particularly shown and described with reference to preferred embodiments thereof, it will be understood by those skilled in the art that various changes in form and details may be made without departing from the spirit and scope of the invention.

The invention claimed is:

1. A system comprising:
a first processing device configured to receive a first portion of an image from an image capture device under test, wherein the first portion of the image comprises a first group of pixel columns and/or pixel rows generated by the image capture device under test in response to illumination; and
a second processing device configured to receive a second portion of the same image from the image capture device under test, wherein the second portion of the image comprises a second separate group of pixel columns and/or pixel rows generated by the image capture device under test in response to the illumination, and wherein the first processing device and the second processing device are configured to process the first portion of the image and the second portion of the image, respectively, in parallel.

2. The system of claim 1, wherein the first processing device is configured to divide the first portion into sub-portions, and wherein the first processing device includes multiple computational units configured to process corresponding sub-portions in parallel.

3. The system of claim 2, wherein the second processing device is configured to divide the second portion into sub-portions, and wherein the second processing device includes multiple computational units configured to process corresponding sub-portions in parallel.

4. The system of claim 1, wherein the first processing device and the second processing device are located in a frame grabber device.

5. The system of claim 1, wherein the first processing device and the second processing device are located in different frame grabber devices.

6. The system of claim 1, wherein the first processing device and the second processing device are configured to output the processed first and second portions of the image to a host computer.

7. A method comprising:
receiving an image generated by a device under test;
dividing, by a frame grabber device, a portion of the image into physically separate sub-portions of rows and/or columns;
processing the sub-portions of rows and/or columns for the image in parallel with corresponding computational units in the frame grabber device; and
outputting, by the frame grabber device, the processed sub-portions of the image to a host computer.

8. The method of claim 7 wherein the device under test comprises an image capture device and further comprising controlling the image capture device to capture the image.

9. The method of claim 8, wherein the controlling of the image capture device further comprises prompting illumination of the image capture device by a light source.

10. The method of claim 9, wherein the controlling of the image capture device further comprises synchronizing a capture of the image by the image capture device with the illumination of the image capture device by the light source.

11. The method of claim 7 further comprising dividing, by the frame grabber device, the image into multiple portions including the portion of the image divided in the sub-portions.

12. A method comprising:
dividing, by a frame grabber device, a portion of an image into sub-portions;
processing the sub-portions of the image in parallel with corresponding computational units in the frame grabber device; and
outputting, by the frame grabber device, the processed sub-portions of the image to a host computer, wherein the sub-portions include groups of pixels of the image that at least correspond to rows of pixels of the image, columns of pixels of the image, or clusters of pixels in a checkerboard configuration in the image.

13. A device comprising:
a first frame grabber device configured to:
receive a stream of pixels for an image generated by a device under test;
divide a first portion of the stream of pixels for the image by rows and/or columns into sub-portions; and
multiple processing devices operating within the first frame grabber configured to separately process the sub-portions of the image in parallel, respectively.

14. The device of claim 13 further comprising a second frame grabber device configured to divide a second portion of an image into sub-portions, wherein the frame grabber device includes multiple processing devices configured to process the sub-portions of the image in parallel.

15. The device of claim 14, wherein the first frame grabber device is configured to divide the image into the first portion and the second portion.

16. The device of claim 13, wherein the first frame grabber device is configured to output the processed sub-portions to a host computer.

17. The device of claim 13, wherein the sub-portions include groups of pixels of the image.

18. The device of claim 17, wherein the groups of pixels correspond to rows of pixels of the image.

19. The device of claim 17, wherein the groups of pixels correspond to columns of pixels of the image.

20. A device comprising:
a first frame grabber device configured to divide a first portion of an image into sub-portions, wherein the frame grabber device includes multiple processing devices configured to process the sub-portions of the image in parallel, wherein the sub-portions include groups of pixels of the image and the groups of pixel correspond to clusters of pixels in a checkerboard configuration in the image.

* * * * *